Patented Jan. 28, 1941

2,229,870

UNITED STATES PATENT OFFICE

2,229,870

PREPARATION AND PURIFICATION OF ZEIN

Leslie O. G. Pearce, Whiting, Ind., assignor, by mesne assignments, to Prolamine Products Incorporated, Dover, Del., a corporation of Delaware No Drawing. Application March 30, 1938, Serial No. 198,896

11 Claims. (Cl. 260—123)

The present invention relates to the preparation of zein from corn. Zein as commonly prepared is highly colored, whereas pure zein is white to pale yellow. The excess color is due to the presence of associated impurities such as the coloring materials xanthrophyll and carotin, and the fats or oils, or lipoids, lecithin, phytosterol, and others.

Numerous methods are known for preparing zein without an excess of such impurities, but such methods have numerous disadvantages. These processes involve processing steps additional to the usual process of preparing zein, making the procedure longer, more difficult, and more expensive. Some of these processes even subject the zein to treatment harmful to it.

The usual process of preparing zein is one of extraction from corn gluten with a zein solvent. A zein solvent is generally recognized as a mixture of water and a water-miscible volatile solvent material such as methyl alcohol, ethyl alcohol, the propyl alcohols, isobutyl alcohol, diethylene glycol, methyl cellosolve, ethyl cellosolve and others. Suitable solvent mixtures for example are:

| Solvent | Water by weight |
| --- | --- |
|  | Percent |
| Ethyl alcohol | 20 |
| Diethylene glycol | 11 |
| Tertiary butyl alcohol | 50 |
| Isopropyl alcohol | 30 |
| Methyl cellosolve | 10 |

The content of water for an aqueous solvent for zein is variable and determines the extent to which the solvent may be saturated with zein. A solvent consisting of 20% water and 80% ethyl alcohol is the most common solvent which has been employed heretofore, and it is still a very practical one at the present time, and for the present invention.

Gluten from corn is extracted with such a zein solvent to remove the soluble zein and to leave undissolved the remaining protein content of the gluten. Unfortunately, coloring matter and fatty material accompany the zein removed. The usual treatment of the zein extract to recover zein leaves these undesired impurities with the zein, both on it, and in it, the zein being solid material.

One type of method for avoiding this is described in U. S. patent to Donard and Labbe No. 744,510. This patent describes first extracting the gluten with benzene or some petroleum ether which is a non-solvent of zein to remove such of these coloring agents and oils or fats as are soluble in the preliminary extracting solvent. Then the so treated gluten is steamed to remove the solvent. Then the zein is extracted with an aqueous zein solvent. It is characteristic of zein that in the presence of heat and moisture zein is "denatured," the extent depending also upon the time of exposure to heat and moisture. This "denaturing" is manifest by loss of solubility in aqueous zein solvents. Hence by this steaming procedure an incomplete recovery of zein results. Generally similar processes are described in their corresponding British Patent No. 28,453, in U. S. patent to Satow No. 1,245,978, and in the French patent to Davion No. 749,733.

A serious defect of this general procedure is the incompleteness of the extraction of the said impurities. The gluten is not swelled by those solvents used to remove coloring matter, fats and oils. The preliminary extraction at its best is superficial, and is aided by fine division of the gluten, which in itself is an additional factor of expense, and a practical disadvantage in the apparatus generally available for extraction, which apparatus is more suitable for coarser material.

A second general process is treatment of impure zein, after its isolation from the gluten, by an extraction procedure with a non-solvent for zein, such as ether, benzol, petroleum solvents, high strength alcohol, etc. Examples of this type are found in Wulkan U. S. Patent No. 696,156, and Longovay U. S. Patent No. 1,884,015, the latter using ether. The form of zein usually so subjected to purification is one which has been precipitated from its aqueous zein-solvent by addition of water. Such zein is commonly precipitated in the form of a gum, dough, or curds, and is seldom granular. In whatever form it is precipitated, it is next dried, and this renders it hard and tough with enclosure of impurities. The solvents employed do not swell or penetrate the zein to render the removal of impurities a clean-cut one.

Another process is described by Osborne in U. S. Patent No. 456,773 who cools an extracted solution of zein until some oil precipitates out. This fails to produce a complete separation.

The last mentioned patent also gives another procedure. Prepared zein of the impure character described, is redissolved in aqueous alcohol and then diluted with sufficient strong alcohol to render the liquid a non-solvent aqueous alcohol for zein, but nevertheless, a solvent for the fat and coloring matter. This is an improvement in the direction of effecting a more complete purification, but large volumes of alcohol are needed, and the solution and precipitation of zein are twice necessitated at considerable expense of time, material and labor.

A process similar to the last procedure is disclosed by Donard and Labbe in German Patent No. 144,217 and the corresponding British Patent No. 8876 of 1902. By this procedure, maize residues are extracted with hot anhydrous amyl alcohol. The extract is diluted with some hydrocarbon or other solvent like carbon tetrachloride to precipitate extracted material except for oil which remains in the liquid. This process does not identify the precipitate as zein, but defines it as corn protein, which term comprehends the non-zein content of corn gluten. Large amounts of solvents are required.

The present invention aims to simplify the procedure for purifying zein as to oils, fats, and coloring matter, and to combine the purification with the preparation of the zein.

Further objects of the invention are to minimize the amount of solvents required, the amount of labor required, the amount of time required, to minimize the necessity of exposing the zein to conditions to denature it, and to recover all the zein from gluten without having subjected zein to conditions which would denature some part of it before its extraction, or after its extraction.

According to the present invention the common procedure of extraction with aqueous zein solvent may be employed to produce a zein extract which contains the said impurities. The recovery of the purified zein from this extract or from any like solution of zein to be purified, is modified by the addition to the solution of a liquid which is of itself a non-solvent for zein, but a solvent for the impurities therein, which is miscible with the zein solution forming a new solvent mixture containing the zein in solution, and which will form the major part of a separable layer to be formed by diluting with water the single phase system containing the zein, the impurities, the aqueous zein solvent, and the added solvent substance, the dilution being such as to precipitate the zein. In other words, the zein is recovered by the prior art step of diluting the aqueous zein solution with water. However, the nature of the solvent in the zein solution is altered by changing the single-phase $(x+y)$—component solvent to a single phase $(x+y+z)$—component solvent, in which $x$ signifies the aqueous component, in which $y$ signifies the water-miscible agent or agents, and in which $z$ signifies the water-immiscible agent or mixture.

The invention therefore operates to form three phases instead of two, upon dilution of the zein solution by water. The result is the solid zein phase, the liquid aqueous phase, and the new or added-agent phase. The added solvent-agent chosen as a basis for the new phase is preferably one which is lighter than water, so that it will float for easy removal. The impurities soluble in the added agent go into this third and new phase from the homogeneous single liquid phase practically simultaneously with the formation of zein as a solid. Thus the aqueous phase effectively separates the solid zein from the solution of these impurities, because the zein remains suspended or settled in the aqueous phase.

The preferred manner of carrying out the precipitation of the zein is to employ conditions which assure the formation of a granular zein product rather than the curd, dough or gum form. The presence of a fine granular zein gives greater assurance against accidental inclusion of droplets of the oil-solvent phase. A granular form of precipitate is assured by using the process of Buron and MacDonough U. S. Patent No. 2,044,769. This calls for an adjustment and maintenance of the hydrogen ion concentration of the zein solution between pH of 6.5 and 12, but preferably in an intermediate range of 7 to 9. The addition of the $z$-component for the practice of the present invention does not render inoperative the process described in said patent. In operating under the Buron et al. process, the solution being precipitated has this desired pH value. This permits dilution with water or aqueous solution of such pH value that the diluted zein solution is still maintained in the desired pH range.

A large number of solvent materials which are relatively immiscible with water are available for selection as the $z$-component, being more or less heavy than water. The extent to which these alone or mixed, are miscible with the $x$ and $y$ components, is dependent upon the temperature, the relative proportions of the water $x$ and the solvent $y$, and upon the content of zein dissolved. It is not necessary to know how much of the $z$ component will dissolve in the zein extract. A slight excess may be used, or the exact amount, or even a deficiency, without in any way altering the nature of the process. The practical method is to add the $z$-component to saturation, which is readily indicated by the presence of a small amount which remains undissolved. A great excess is wasteful. A deficiency may cause the $z$-phase to be too small in volume and hence too concentrated, so that in manipulating it, unremoved portions or residues may accidentally contaminate the solid zein.

Suitable $z$-components are hydrocarbons such as benzol, toluol, gasoline, naphtha, petroleum ether, xylene, and hydrocarbon derivatives such as carbon tetrachloride, chloroform, ethylene dichloride, etc. The most efficient ones are those which have a high solubility in the $(x+y)$ phase, which is the zein solvent. As stated above, this need not be alcoholic, since other aqueous solvent mixtures are also suitable for zein extraction and for zein solvents. Choice of the $z$-component is also determined by the preference for a floating $z$-phase, but this is by no means a requirement of the process. Anyone skilled in the art may readily determine the single phase equilibrium mixtures of zein, the aqueous zein solvent, and the $z$-component, to indicate the desirable $z$-components for the operations intended.

For example, it has been determined that a zein solution containing from 5% to 30% of zein, and from 95% to 70% of zein solvent consisting of ethyl alcohol 80% to 85% and water 20% to 15%, will take up a volume of toluol as a $z$-component, at ordinary temperatures, which is from 18% to 25% of the volume of the zein solution, and in so doing maintain a single phase.

To carry out the present invention then on the basis of the data as ascertained above, the following procedure may be observed: A zein solvent of 80% to 85% ethyl alcohol and the remainder water, is used to dissolve zein. This may be solid zein containing the coloring and oil impurities. Preferably, however, the solvent is used to extract corn gluten until the solid content of the extracting fluid is from 5% to 30% solids. Then, to assure a granular precipitate of zein, an alkali or buffer agent is added to bring the pH into the range from 6.5 to 9.5. This may be done by adding a solution of sodium hydroxide, for example a 15° Bé. solution, to bring the pH to between 8 and 9. The amount may vary with the character and source of the zein, so that determination of the pH itself is used to limit the amount. The adjustment may be made before or after the z-component is added. Then from 20% to 25% by volume of toluol or benzol is added and the mixture agitated until homogeneous. Then water is added slowly while the liquid is rapidly agitated. As the water is taken up, zein begins to precipitate as a granular solid, and the rate of dilution may be increased. A dilution to 500% of original volume is preferred. Small globules of toluene form which begin to rise to the surface and form a layer containing coloring matter and oil or fat. After standing, this layer may be drawn off for recovery of one or more of its constituents. The settled zein with supernatant water containing the alcohol may be separated, the zein washed, and dried under conditions to avoid denaturing where soluble undenatured zein is desired. The supernatant liquor may still contain some globules of toluol which may be forced to rise and agglomerate by increasing the specific gravity of the water layer. This may be done by adding a salt, such as sodium chloride, to the liquor. The salt may be readily washed out of the zein. Alcohol may be recovered in a still.

The wet zein is a pale yellow granular precipitate retaining when pressed, about 70% of water. It may be spread out on trays in thin layers to dry in the air without any danger of denaturing.

It should be observed as a matter of accuracy, rather than as a matter of importance, that the usual partition effects between separated liquids will be found in the foregoing example. A very small amount of alcohol may be found in the toluol layer, and a very small amount of toluol may be found in the aqueous alcohol layer which is about 15% ethyl alcohol. It is also to be noted, as found by observation and test, that the phase equilibrium conditions for the system water-ethyl alcohol-toluol, are shifted by the presence of dissolved zein. The shift, however, is not great.

The invention is not limited to aqueous ethyl alcohol as the zein solvent or extractant. The following table gives the kind of added solvent and per cent, by volume based on aqueous solvent, which can be taken up by zein solutions in the particular zein solvents specified, measured at ordinary room temperatures, including the data given above for the aqueous ethyl alcohol solvent:

| Kind of solvent | Percent solvent by weight | Percent water by weight | Oil solvent | Percent oil solvent by volume |
| --- | --- | --- | --- | --- |
| Ethyl alcohol | 80 to 85 | 15 to 20 | Benzol | 18 to 25 |
| Do | 80 to 85 | 15 to 20 | Toluol | 18 to 25 |
| Isopropyl alcohol | 70 | 30 | do | 22 |
| Tertiary butyl alcohol | 50 | 50 | Benzol | 7 |
| Diethylene glycol | 89 | 11 | do | 15 |
| Methyl cellosolve | 90 | 10 | do | 200 |

From the foregoing it can readily be seen that where a high degree of purity is desired, or where an extremely colored or oily zein, or gluten extracted from zein, is at hand, the extraction or solution may be made with 90% methyl cellosolve, so that a large volume of benzol may be added. While maintaining a single phase, a large benzol phase may form on dilution which will have a correspondingly low concentration of the impurities dissolved therein.

It will of course be understood that the invention is not limited to the details of procedure and material herein given as the preferred manner of carrying out the invention set forth in the appended claims.

I claim:

1. The method of making zein relatively free from oil and color impurities both derived with zein from corn gluten, which comprises adding to a solution of the impure zein in an aqueous zein solvent, a water-immiscible ingredient which is a non-solvent for zein and a solvent capable of dissolving said impurities, which ingredient is furthermore soluble to a considerable extent in the zein solution without precipitation of zein therefrom, the addition being such as to form a liquid phase containing all the zein, the aqueous zein solvent and a quantity of the added water-immiscible ingredient, and then diluting the said liquid phase with water to render the same highly aqueous and a non-solvent for zein, whereby the zein precipitates, and the water-immiscible ingredient forms a separable layer containing said impurities.

2. The method of making zein relatively free from oil and color impurities both derived with zein from corn gluten, which comprises adding to a solution of the impure zein in an aqueous zein solvent, a water-immiscible ingredient which is a non-solvent for zein and a solvent capable of dissolving said impurities, which ingredient is furthermore soluble to a considerable extent in the zein solution without precipitation of zein therefrom, the addition being such as to form a liquid phase containing all the zein, the aqueous zein solvent and a quantity of the added water-immiscible ingredient, then diluting the said liquid phase with water to render the same highly aqueous and a non-solvent for zein, whereby the zein precipitates, and the water-immiscible ingredient forms a separable layer containing said impurities, and during said dilution with water maintaining the hydrogen ion concentration of the zein solution at a pH of from 6.5 to 12 whereby the zein is precipitated in granular form.

3. The method of preparing a relatively pure zein which comprises extracting corn gluten with an aqueous zein solvent to provide a solution of zein in said solvent, adding to said solution a water-immiscible ingredient which is a non-solvent for zein and a solvent for extracted oil and color impurities derived from the gluten, which ingredient is soluble to a considerable extent in the zein solution without precipitation of zein therefrom, the addition being such as to form a liquid phase containing all the zein, the aqueous zein solvent and a quantity of the added ingredient, and then diluting the said liquid phase with water to render the same highly aqueous and a non-solvent for zein, whereby the zein precipitates, and the water-immiscible ingredient forms a separable layer containing said impurities.

4. The method of preparing a relatively pure zein which comprises extracting corn gluten with an aqueous zein solvent to provide a solution of zein in said solvent, adding to said solution a water-immiscible ingredient which is a non-solvent for zein and a solvent for extracted oil and color impurities derived from the gluten, which ingredient is soluble to a considerable extent in the zein solution without precipitation of zein therefrom, the addition being such as to form a liquid phase containing all the zein, the aqueous zein solvent and a quantity of the added ingredient, then diluting the said liquid phase with water to render the same highly aqueous and a non-solvent for zein, whereby the zein precipitates, and the water-immiscible ingredient forms a separable layer containing said impurities, and during said dilution with water maintaining the hydrogen ion concentration of the zein solution at a pH of from 6.5 to 12, whereby the zein is precipitated in granular form.

5. The method of making zein relatively free from oil and color impurities both derived with zein from corn gluten, which comprises forming a solution of zein in a zein solvent consisting of 80% to 85% by weight of ethyl alcohol and from 20% to 15% by weight of water, dissolving therein a liquid hydrocarbon solvent from the group consisting of benzol and toluol, the amount of such hydrocarbon being from 18% to 25% by volume of the zein solution, and diluting the resulting solution from one volume to about 5 volumes with water, whereby zein precipitates, and the hydrocarbon solvent forms a separable layer containing said impurities.

6. The method of making zein relatively free from oil and color impurities both derived with zein from corn gluten, which comprises forming a solution of zein in a zein solvent consisting of 80% to 85% by weight of ethyl alcohol and from 20% to 15% by weight of water, dissolving therein a hydrocarbon solvent from the group consisting of benzol and toluol, the amount of such hydrocarbon being from 18% to 25% by volume of the zein solution, diluting the resulting solution from one volume to about 5 volumes with water, whereby zein precipitates, and the hydrocarbon solvent forms a separable layer containing said impurities, and during said dilution with water maintaining the hydrogen ion concentration of the zein solution at a pH of from 6.5 to 12, whereby the zein is precipitated in granular form.

7. The method of making zein relatively free from oil and color impurities both derived with zein from corn gluten, which comprises adding water to a solution if impure zein in a mixed solvent including a water-miscible portion and a water-immiscible portion which is a solvent for said impurities and a non-solvent for zein, whereby the zein is precipitated and suspended in a resulting aqueous phase, and whereby a resulting separable water-immiscible phase is formed containing said impurities.

8. The method of making zein relatively free from oil and color impurities both derived with zein from corn gluten, which comprises adding water to a solution of impure zein in a mixed solvent including a water-miscible liquid component and a water-immiscible liquid hydrocarbon component which later is a solvent for said impurities and a non-solvent for zein, whereby the zein is precipitated and suspended in a resulting aqueous phase, and whereby a resulting separable hydrocarbon phase is formed containing said impurities.

9. The method of separating zein and attendant oil and color impurities derived with zein from corn gluten, which comprises simultaneously dissolving the zein and said impurities in a mixed solvent having (1) a water-miscible component which may be diluted with water to form a non-solvent for zein, and (2) a water-immiscible component which is a non-solvent for zein but a solvent for said impurities, and adding water to render the first mentioned component a non-solvent for zein whereby zein is precipitated, the addition of water likewise causing the water-immiscible ingredient to form a separable layer including impurities.

10. The method of separating zein and attendant oil and color impurities derived with zein from corn gluten, which comprises simultaneously dissolving the zein and said impurities in a mixed solvent having (1) a water-miscible component and (2) a water-immiscible component which is a non-solvent for zein but a solvent for said impurities, and adding water in sufficient quantity to form an aqueous phase and a water-immiscible phase, the latter comprising said water-immiscible component, oil and coloring matter derived from said solution.

11. The method of preparing a relatively pure zein which comprises extracting corn gluten with a zein solvent which is water-miscible to provide a solution of zein in said solvent, adding to said solution a water-miscible ingredient which is a non-solvent for zein and a solvent for extracted oil and color impurities derived from the gluten, which ingredient is soluble to a considerable extent in a zein solution without precipitation of zein therefrom, the addition being such as to form a liquid phase containing all the zein, the aqueous zein solvent, and a quantity of the added ingredient, and then diluting the said liquid phase with water to render the same sufficiently aqueous, so that it breaks up forming a water-immiscible phase of said ingredient as a separable layer containing said impurities.

LESLIE O. G. PEARCE.